United States Patent [19]

DiCicco

[11] Patent Number: 5,380,224
[45] Date of Patent: Jan. 10, 1995

[54] REPAIRABLE CABLE ASSEMBLY

[75] Inventor: William M. DiCicco, East Haddam, Conn.

[73] Assignee: Ametek Aerospace Products, Inc., Wilmington, Mass.

[21] Appl. No.: 203,671

[22] Filed: Feb. 28, 1994

Related U.S. Application Data

[63] Continuation of Ser. No. 868,409, Apr. 14, 1992, abandoned.

[51] Int. Cl.⁶ .............................................. H01R 9/03
[52] U.S. Cl. ................................ 439/610; 439/447; 439/905
[58] Field of Search ............... 439/607, 604, 606, 610, 439/609, 162, 445, 447, 904, 905

[56] References Cited

U.S. PATENT DOCUMENTS

| | | | |
|---|---|---|---|
| 3,914,003 | 10/1975 | Loy | 439/604 |
| 3,992,773 | 11/1976 | Duffner et al. | 439/610 |
| 4,358,634 | 11/1982 | Dienes | 174/92 |
| 4,376,229 | 3/1983 | Maul et al. | 174/35 R |
| 4,376,229 | 3/1993 | Maul et al. | 174/35 R |
| 4,437,691 | 3/1984 | Laney | 439/331 |
| 4,615,574 | 10/1986 | Pearman | 439/607 |
| 4,647,717 | 3/1987 | Campbell et al. | 174/93 |
| 4,685,758 | 8/1987 | Yoshida | 439/606 |
| 4,707,200 | 11/1987 | Giebel et al. | 156/48 |
| 4,732,628 | 3/1988 | Dienes | 156/48 |
| 4,909,547 | 3/1990 | Guy | 285/169 |
| 4,933,512 | 6/1990 | Nimiya et al. | 174/92 |
| 4,985,598 | 1/1991 | Bubica et al. | 174/93 |
| 5,018,987 | 5/1991 | Kirma | 439/447 |

Primary Examiner—Larry I. Schwartz
Assistant Examiner—Hien D. Vu
Attorney, Agent, or Firm—R. V. Westerhoff; George K. Stacey

[57] ABSTRACT

A repairable cable assembly includes a corrugated metal tubing backshell secured at one end to the end of stiff preferably electrically shielding cable sleeve and at the other end to a coupling assembly which is detachable from a connector and retractable along wiring extending from the cable sleeve through axial collapse of the corrugated metal tubing to provide access to the connections of the wiring to electrical contacts housed in the connector. Where the cable sleeve is braided wire, a waterproof thermosetting polymer cover is provided over the braided wire and its connections to the corrugated metal tubing backshell. The coupling assembly can include a straight, right or other angle tubular member to which the corrugated tubing is secured.

19 Claims, 3 Drawing Sheets

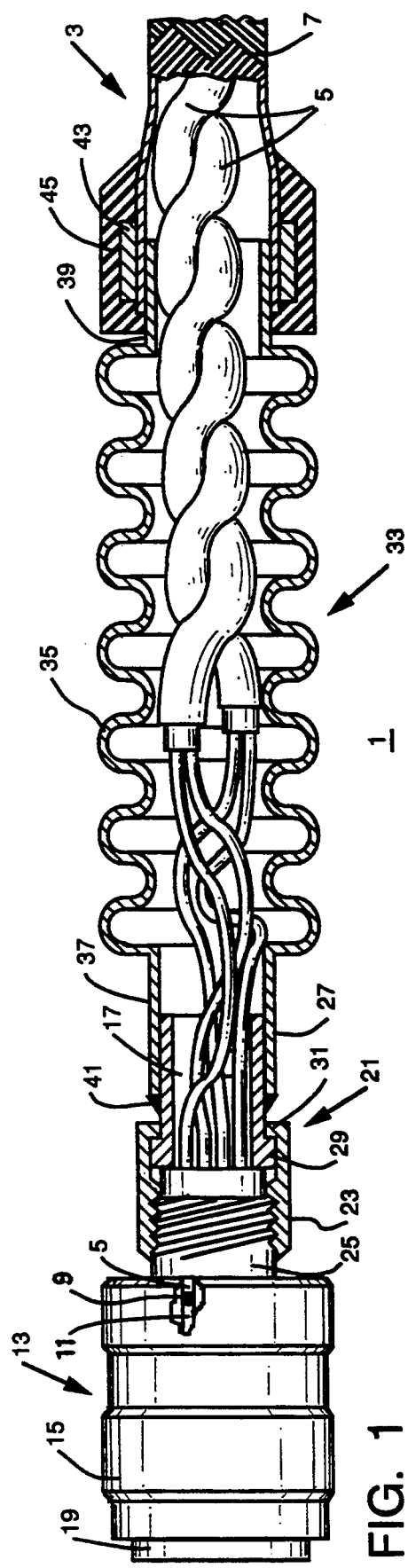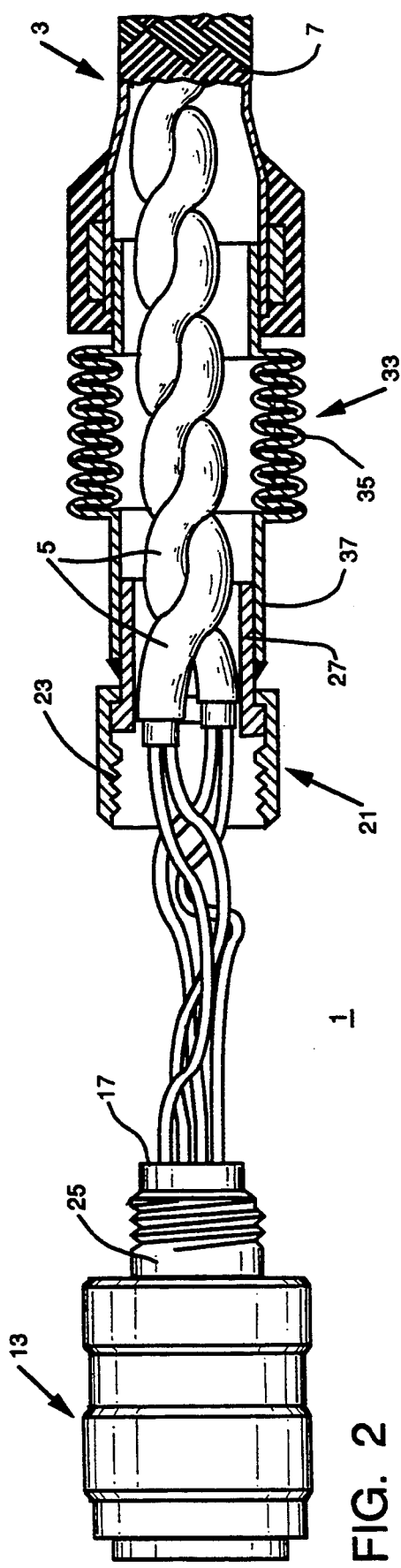

REPAIRABLE CABLE ASSEMBLY

This application is a continuation of Ser. No. 07/868,409 filed Apr. 14, 1992, now abandoned.

BACKGROUND OF THE INVENTION

1. Field of the Invention

This invention is directed to electrical cable assemblies which include a cable with a stiff, preferably EMI/RFI shielding and/or environmentally secure, sleeve and a connector having contacts attached to wiring within the cable sleeve and which must be accessible for repair.

2. Background Information

There are many installations where electrical cables are subjected to very hostile operating conditions. One example is electrical cables used on gas turbine engines. Such cables must be capable of operating through a wide temperature range, for instance about $-55°$ C. to $200°$ C. continuous operating temperature. They must also be resistant to aviation fuel, hydraulic oil, lubricating oil and deicing fluids. In addition, these cables must be moisture resistant, flexible, capable of withstanding vibration, and be shielded from electromagnetic interference (EMI) and radio frequency interference (RFI).

Electrical cable assemblies for combustion engines in particular should also be easily and economically repairable, not only at depot level, where more involved and tooling intensive repair can be performed, but also in the field. For effective repair in the field, the cable assemblies should be such that the tools required to facilitate the repair can be limited to those tools commonly supplied with replacement connectors or found in a typical tool box. The need for electrical power to facilitate repair should be avoided. In addition, the degree of difficulty in performing the repair should be minimized. The procedure should also be concise and straightforward, eliminating the need for detailed instructions. Finally, the number of individual components that must be removed or replaced in the repair procedure should be minimized, and loose parts that could become separated from the assembly should not be used.

Presently, there are four basic design concepts for repairable cable assemblies used in hostile environments. None of these four designs meet all of the above requirements for repairable cable assemblies. The four basic design concepts are: (1) open bundles, (2) conduits/raceways, (3) braid socks, and (4) shrink sleeve boots.

Open bundle designs are composed of shielded complexes, twisted shielded pairs, triples, quads, etc., laid up into a cable assembly. These complexes are then bundled by lacing ties and installed on the engine. The connectors are easily accessible for removal and replacement of damaged contacts and the entire circuits can be removed and replaced easily. While these open bundle cable assemblies offer a high degree of repairability, are light in weight, flexible and the lowest in cost, their EMI/RFI immunity is not always sufficient, and moisture resistance and abrasion resistance are poor.

Conduit, or raceway designs are another way of building cable assemblies with a high degree of repairability. These designs have an increased resistance to abrasion, moisture and EMI/RFI interference as opposed to open bundled designs. They are similar to open bundle designs with the exception that the individual complexes are routed through conduit to the connectors. By conduit, it is meant continuous tubing. The conduit can be either metallic or non-metallic/shielded. Specially designed backshells and breakout transitions are used that allow the conduit to be disconnected at the connector or breakout transition facilitating repair.

Excess wire, one to two inches is designed into each of the circuits of the conduit/raceway assembly. This extra wire is stored in the conduit backshell at the time of assembly. This allows the connector to be extended out away from the conduit/backshell assembly during the repair procedure permitting access to the contacts for removal.

The advantages to the conduit/raceway system are: excellent repairability, only tools normally supplied with the connectors are required for repair, entire circuits can be removed or replaced, abrasion resistance is good, they can be made moisture proof, and EMI/RFI immunity is good. On the other hand, the backshells, adaptors and breakout transitions used to connect the conduit to the connectors and the conduits themselves add significant weight to the cable assembly. The conduit restricts flexibility, the cables within the conduit can become excited in response to vibration with a high probability of abrasion of conductor insulation, and this is the most costly of the cable assemblies.

Braid socks are another method of designing in repairability to a shielded cable assembly. The outer braided wire shield is purposely braided loosely over the last two to three inches of the cable that attaches to the connector backshell. This loosely braided portion allows the backshell to be removed from the connector and forced back upon the cable to provide accessibility for contact removal or repair.

Braid socks that are actually two layers of loosely braided material can be purchased already attached to connector backshells. These sections of braid are then soldered to the end of the braid on the cable assembly before being attached to the connector. The double layer of loosely braided shield material is used to reduce the number of "holes" that appear in the braid as a result of the loose braiding. These "holes" allow electromagnetic and radio frequency signals to enter and leave the cable unattenuated.

Braided sock cable assemblies have good repairability, require only tools normally supplied with the connector, are relatively light weight, are abrasion resistant when stainless steel is used as the outer braid and flexibility is good. Although not as flexible as open bundle type cables, the reduction in flexibility is a result of the added EMI/RFI shielding, and not the braid sock. Disadvantages of the braided sock assembly are: they cannot be easily moisture proofed, EMI/RFI shielding is degraded with each repair, and entire circuits cannot be replaced. In terms of value for the dollar, this type of assembly is very cost effective.

The shrink sleeve boot design, which has been recently introduced, combines the braid sock principle with the use of heat shrinkable connector boots and cable jacketing. The heat shrink sleeving is applied over the cable outer braid. A heat shrinkable boot joins the connector backshell to the cable and seals onto the cable heat shrink jacket. Beneath this boot is the loosely braided sock. Repair is accomplished by reheating the heat shrinkable boot and a section of the cable jacketing. The connector backshell is then removed from the connector. The reheated boot is flexible enough so that the backshell braid sock and heat shrink cable jacketing is capable of being pushed back enough to allow access to the connector for repair. The shrink sleeve boot design has the same advantages as the braided sock design with the addition that the shrink sleeving makes the cable moisture proof. This type of design has a disadvantage that a heat gun is required for repair and this requires electric power. In addition, EMI/RFI immunity is subject to the same degradation as a result of repair as discussed in connection with the braid sock design. Furthermore, the braided shield can cause damage to the shrink sleeve jacket during repair thereby degrading moisture resistance. The application of heat causes the shrink sleeving materials to loose most of their tear resistance. This design for a repairable cable assembly is also quite costly.

SUMMARY OF THE INVENTION

It is the primary object of this invention to provide an improved repairable cable assembly that is easily repairable, resistant to hostile environments, and cost effective. These and other objects are realized by the invention which is directed to a repairable cable assembly which includes an axially collapsible backshell secured at one end to a stiff sleeve covering the cable wiring and at the opposite end to a coupling member which removably engages the connector containing the electrical contacts. The coupling is removable from the connector and axially retractable from the connector along the wiring through axially collapse of the axially collapsible backshell to provide access to the electrical connections. Preferably, the axially collapsible backshell is corrugated tubing, and more particularly metal corrugated tubing. The stiff sleeve of the cable assembly may be conduit, either metallic, or non-metallic with a shielding layer, a braided shielding sleeve, or corrugated tubing integral with the collapsible backshell. In addition, a thermosetting polymer outer layer can be provided for abrasion resistance and waterproofing.

The connecting member includes a rigid tubular member which may be straight or bent at an angle, for instance 90°, and a connection member such as a C-nut which removably secures the rigid tubular member to the connector shell. The corrugated tubing backshell is permanently secured to the rigid tubular member.

BRIEF DESCRIPTION OF THE DRAWINGS

A full understanding of the invention can be gained from the following description of the preferred embodiments when read in conjunction with the accompanying drawings in which:

FIG. 1 is a side view, partially in longitudinal section and with some parts broken away, of a repairable cable assembly having an axially collapsible backshell in accordance with the invention shown in the assembled condition.

FIG. 2 is a view similar to FIG. 1 showing the axially collapsible backshell collapsed to provide access to the contacts for repair.

DESCRIPTION OF THE PREFERRED EMBODIMENTS

Figure 3:
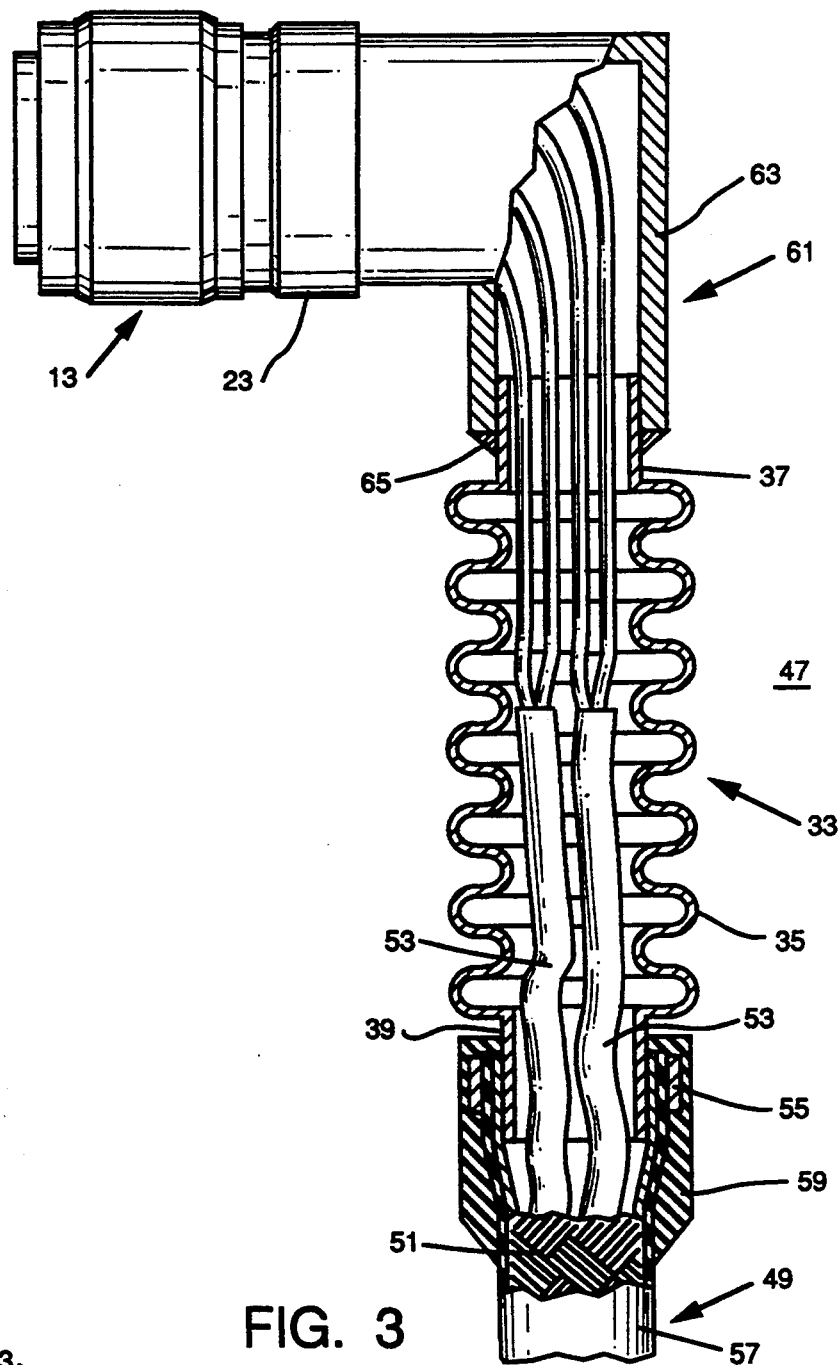
FIG. 3 is a side view, partially in longitudinal section of a repairable cable assembly in accordance with another embodiment of the invention.

FIG. 1 illustrates a first embodiment of the repairable cable assembly 1 of the invention. The cable assembly 1 includes a cable 3 having a number of electrical leads 5 encased in a stiff sleeve 7. In the embodiment of the invention shown in FIG. 1, the stiff sleeve 7 is braided shielding. This is conventional cable in which the braided shielding provides immunity from EMI/RFI interference.

The electrical leads 5 are connected such as by crimping or soldering 9 to the back of contacts 11 mounted in a connector 13. The connector has a metallic shell 15 with a rear opening 17 through which the electrical leads 5 extend to reach the contacts 11. The forward end 19 of the connector 13 is configured to mate a complementary connector or receptacle as is conventional.

A coupling member 21 includes a self-locking coupling nut 23 which threads onto a threaded collar 25 defining the rear opening 17 at the rear of the connector shell 15. The coupling member 21 also includes a rigid tubular member 27 which has a radially outward flange 29 on one end which is engaged by a radially inward extending flange 31 on the self-locking nut 23. Between the coupling member 21 and the braided shielding sleeve 7 is an axially collapsible backshell 33. This axially collapsible backshell 33 has a corrugated center section 35 with cylindrical forward and rear end sections 37 and 39, respectively. The axially collapsible backshell 33 is electrically conductive to provide continuity of the shielding of the electrical lead and is strong enough to provide physical protection of the leads. Conveniently, the axially collapsible backshell 33 can be made of corrugated metal tubing, and specifically stainless steel corrugated tubing with the cylindrical end sections 37 and 39.

The forward cylindrical end section 37 of the axially collapsible backshell 33 telescopes with the rigid tubular member 27 of the coupling member 21 and is permanently secured thereto such as by a 360° braze 41.

The rear cylindrical end section 39 of the axially collapsible backshell 33 telescopes into the braided shielding sleeve 7 which is permanently secured to the cylindrical end 39 by any suitable means such as by welding, brazing, a wire clamp, or preferably as shown, by a magnetic pulse formed ring 43. Support of the cable/backshell junction can be provided by a transition member such as overmolding, epoxy grouting, or a shrink sleeve. In the exemplary embodiment, an overmold 45 of a thermosetting polymer such as neoprene, silicon, or preferably Fluorel ®, is used.

The metal, axially collapsible backshell 33 not only provides EMI/RFI immunity for the electrical leads between the braided shielding sleeves and the coupling member but also is flexible and is impervious to fluids to which such cable assemblies are typically exposed.

When inspection, and repair or replacement of the contacts 11 are required, the self-locking coupling nut 23 can be unthreaded from the connector 13 and the corrugated section 35 of the backshell 33 collapsed axially as shown in FIG. 2 to provide access to the contacts through the rear opening 17 in the connector shell 15. It should be noted, that the connection of the braided shielding 7 does not have to be removed to provide access to the contacts. When the repair has been completed, the backshell 33 is stretched out and the coupling nut 23 is rethreaded onto the collar 25 on the connector.

FIG. 3 illustrates another embodiment of the repairable cable assembly 47 in accordance with the invention. The cable 49 includes the stiff sleeve 51 again in the form of braided shielding housing electrical leads 53. The braided shielding 51 is again telescoped over and secured to the rear cylindrical end section 39 of the axially collapsible backshell 33 and secured thereto such as by a magnetic pulse formed ring 55. This embodiment of the cable assembly includes an outer cable jacket which may be a thermosetting polymer shrink sleeve 57 or blown on tubing over the braided shielding 51 to provide abrasion resistance and moisture proofing for the cable 49. This outer cable jacket can be neoprene, silicon or for example Viton ® shrink sleeving. A transition member such as a thermosetting polymer overmold 59 bonds to the shrink sleeve 57 and the backshell end section 39 to form therewith a waterproof cover.

In the cable assembly of FIG. 3, the coupling member 61 includes a right angle rigid tubular member 63 to which the forward end 37 of the axially collapsible backshell 33 is brazed at 65. The other end of the right angle tubular member 63 is secured to the connector 13 by the self-locking nut 23. Of course, any other angle backshell 63 can be used as required by the application.

Figure 4:
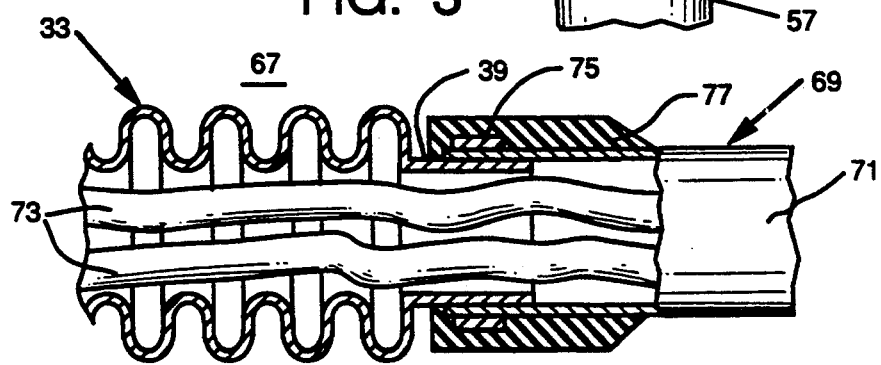
FIG. 4 is a side elevation view, partially in longitudinal section, of a repairable cable assembly in accordance with yet another embodiment of the invention.

FIG. 4 illustrate an embodiment of a repairable cable assembly 67 in which the cable 69 includes a metal conduit 71 enclosing the lead 73. This metal conduit 71 is permanently secured to the rearward extending end 39 of the axially collapsible backshell 33, again by any suitable means such as the magnetic pulse formed ring 75. A transition member such as the thermosetting polymer overmold 77 can also be provided as shown. The metal conduit 71 can be, for instance, stainless steel or aluminum.

Figure 5:
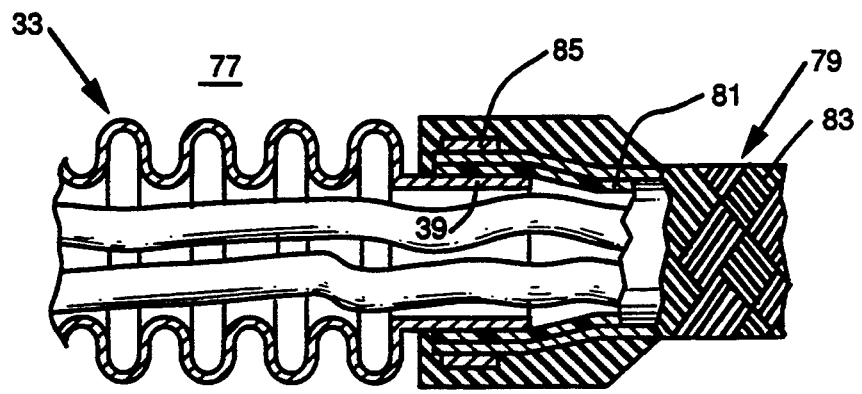
FIG. 5 is a side elevation view, partially in section of a repairable cable assembly in accordance with still another embodiment of the invention.

FIG. 5 illustrates a repairable cable assembly 77 in accordance with another embodiment of the invention where the cable 79 has as the stiff sleeve a non-metallic conduit 81. Teflon ® is a suitable material for this non-metallic conduit. A braided shielding sleeve 83 is provided over the non-metallic conduit 81 to provide the EMI/RFI immunity. The conduit 81 and braided shielding 83 are secured to the rear cylindrical end section 39 of the axially compressible backshell 33, such as by the magnetic pulse formed ring 85.

Figure 6:
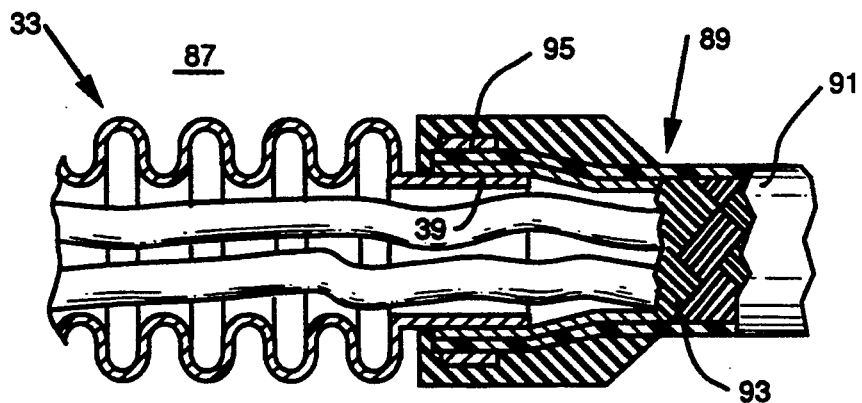
FIG. 6 is a side elevation view partially in section, illustrating a modified form of the embodiment of the invention illustrated in FIG. 5.

FIG. 6 is a fragmentary view of a partial section through a modification of the embodiment of the cable assembly of FIG. 5. In this modification also, the cable 89 again includes as the stiff sleeve a non-metallic conduit 91. However, in this case, the braided shielding 93 is provided inside the non-metallic conduit 91. In the exemplary embodiment of this modification, a magnetic pulse formed ring 95 secures the conduit and shielding to the rearwardly extending end 39 of the axially collapsible backshell 33.

Figure 7:
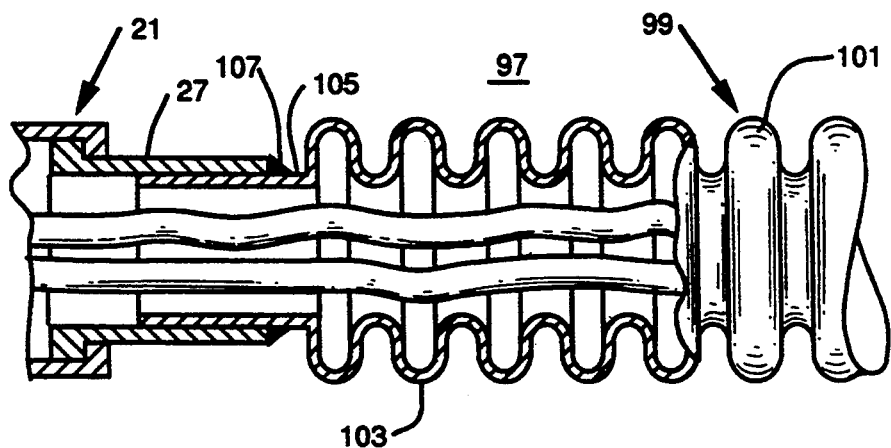
FIG. 7 is a side elevation view, partially in section, of a repairable cable assembly in accordance with an additional embodiment of the invention.

FIG. 7 illustrates a cable assembly 97 in which the cable 99 has as the stiff sleeve, corrugated metal tubing 101 which is integral with the metallic, axially collapsible backshell 103. The cylindrical forward extending end 105 of the axially collapsible backshell 103 is permanently secured to the rigid tubular member 27 of the coupling member 21 such as by brazing at 107.

In the exemplary embodiments of the repairable cable assembly of the invention, the axially collapsible backshell is constructed from 0.007 inches (0.178 mm) thick 321 corrugated stainless steel. The backshell can be provided in different lengths. However, the axial collapsible backshell should be about at least 1.5 inches (38.1 mm) in the expanded condition to allow sufficient space for easy repair. This allows the connected backshell to be retracted at least about 0.75 inches (19.05 mm) from the connector during repair.

The advantages of the cable assembly in accordance with the invention are:

(1) Repairability is excellent. The connector is easily accessible and instructions required to complete repair are those supplied with connectors.

(2) The only tools required to complete repair are those tools included with connectors.

(3) Weight is not increased. The weight of the stainless steel backshell is the same as that of a similar length of braided stainless steel material.

(4) The backshell can be used with any type of braid termination; solder, magnetic pulse forming hose clamps etc.

(5) When used with shielded or conduit type construction, the flexibility for each of the designs remains the same.

(6) The cables can be made moisture proof by the addition of Fluorel ® shrink sleeving or any other suitable jacket material and overmolding the backshell to the cable jacket.

(7) EMI/RFI Immunity is not impaired by repair. the braid termination never requires removal and the repair procedure does not impart any stress on the outer shield.

(8) when used with a conduit type construction entire circuits can be replaced.

(9) Eliminates the need for excess wire to be stored in backshell when using the conduit type construction.

(10) The backshell is the only portion of the cable assembly that is handled during repair. There is no danger of damage to any other components of the assembly as a result of an attempted repair.

(11) Abrasion resistance is excellent. A variety of abrasion resistant jackets can be applied over the moisture resistant jacket to provide protection or a conduit system can be used.

(12) The cost of this type of assembly is lower than all other designs except the open bundle and approximately equal in cost to the braid sock design.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A repairable cable assembly comprising:
  an electrical connector having an electrically conductive shell and electrical contacts mounted inside said shell and accessible through a rear opening in said shell;
  an electrically conductive coupling member removably engaging said shell over said rear opening;

a cable having an electrically conductive stiff sleeve and wiring inside said stiff sleeve, said electrically conductive stiff sleeve providing electrical shielding for said wiring; and an axially collapsible and electrically conductive back shell electrically connected at one end to an end of said electrically conductive stiff sleeve and at an opposite end to said coupling member, said wiring extending frown the end of said electrically conductive stiff sleeve, through said axially collapsible back shell and coupling into said connector and connected by electrical connections to said electrical contacts, said coupling member being removable from said connector shell and axially retractable from said connector shell by axial collapse of said axially collapsible back shell to provide access to said electrical connections, said axially collapsible and electrically conductive back shell providing sole electrical shielding for said wiring between said end of said electrically conductive stiff sleeve and said electrically conductive coupling member with said coupling member connected to said shell.

2. The repairable cable assembly of claim 1 wherein said axially collapsible backshell is a section of corrugated tubing.

3. The repairable cable assembly of claim 2 wherein said corrugated tubing is corrugated metal tubing.

4. The repairable cable assembly of claim 2 wherein said stiff sleeve comprises a braided shield permanently secured to said opposite end of said corrugated tubing.

5. The repairable cable assembly of claim 2 wherein said stiff sleeve comprises a braided shield permanently secured to said corrugated tubing, and a waterproof cover over said braided shield and extending over said opposite end of said corrugated tubing.

6. The repairable cable assembly of claim 5 wherein said waterproof cover is a thermosetting polymer.

7. The repairable cable assembly of claim 2 wherein said stiff sleeve comprises an electrically conductive conduit.

8. The repairable cable assembly of claim 7 wherein said corrugated tubing is stainless steel corrugated tubing.

9. The repairable cable assembly of claim 1 wherein said stiff sleeve comprises a conduit.

10. The repairable cable assembly of claim 1 wherein said stiff sleeve comprises a conduit and an electrically conductive layer over said conduit and permanently connected to said other end of said axially collapsible backshell.

11. The repairable cable assembly of claim 10 wherein said electrically conductive layer comprises a braided shield.

12. The repairable cable assembly of claim 11 wherein said stiff sleeve further includes an abrasion resistant layer over said braided shield.

13. A repairable cable assembly comprising:
an electrical connector having an electrically conductive shell and electrical contacts mounted inside said shell and accessible through a rear opening in said shell;
an electrically conductive coupling member removably engaging said shell over said rear opening, said coupling member including a rigid tubular member and a connecting member removably connecting said tubular member to said rear opening in said connector shell;
a cable having an electrically conductive stiff sleeve and wiring inside said stiff sleeve; and
an axially collapsible and electrically conductive back shell electrically connected at one end to an end of said electrically conductive stiff sleeve and at an opposite end to said tubular member of said coupling member, said wiring extending frown said end of said electrically conductive stiff sleeve through said axially collapsible back shell and said coupling member to said connector and connected by electrical connections to said electrical contacts, said coupling member being removable from said connector shell and axially retractable from said connector shell by axial collapse of said axially collapsible back shell to provide access to said electrical connections, said axially collapsible and electrically conductive back shell providing sole electrical shielding for said wiring between said end of said electrically conducive stiff sleeve and said tubular member.

14. The repairable cable assembly of claim 13 wherein said rigid tubular member is bent about a transverse axis.

15. The repairable cable assembly of claim 14 wherein said rigid tubular member is bent about 90° about a transverse axis.

16. The repairable cable assembly of claim 1 wherein said stiff sleeve is axially collapsible and is integral with said axially collapsible backshell.

17. The repairable cable assembly of claim 16 wherein said integral axially collapsible sleeve and axially collapsible backshell is corrugated electrically conductive tubing.

18. The repairable cable assembly of claim 17 wherein said corrugated electrically conductive tubing is corrugated stainless steel tubing.

19. The repairable cable assembly of claim 17 wherein said coupling member includes a rigid tubular member and a connecting member removably connecting said tubular member to the shell of said connector over said rear opening, said corrugated electrically conductive tubing being secured to said rigid tubular member.

* * * * *